United States Patent [19]

Andoh et al.

[11] Patent Number: 5,681,383

[45] Date of Patent: Oct. 28, 1997

[54] SURFACE-TREATING AGENT FOR HIGH-TEMPERATURE REFRACTORY MATERIAL AND METHOD FOR TREATMENT THEREWITH

[76] Inventors: Takeshi Andoh, 1275-48 Uwanari Tamashima; Yasuyuki Yamaguchi, 737-2 Hashima; Tadakatu Kisi, 845-34 Itsukaichi, all of Kurashiki-shi, Okayama-ken; Hiroaki Motoyama, 22-21, Shonandai 3 chrome, Fujisawa-shi, Kanagawa-ken; Yoshimi Imoto, 1-C4-302, Shinsenri-kitamachi 1 chome, Toyonaka-shi, Osaka-fu; Matsumi Hirao, 18-2, Mukogaoka 6 chome, Sanda-shi, Hyogo-ken, all of Japan

[21] Appl. No.: 539,703

[22] Filed: Oct. 5, 1995

[30] Foreign Application Priority Data

Oct. 14, 1994 [JP] Japan .................. 6-274255

[51] Int. Cl.[6] .................................. C04B 41/50
[52] U.S. Cl. .................. 106/287.1; 106/287.14; 106/600; 106/603; 252/28; 252/30
[58] Field of Search .................. 252/27, 28, 30; 106/600, 603, 287.1, 287.14

[56] References Cited

U.S. PATENT DOCUMENTS 1,564,394  12/1925  Youngman .................. 106/600

FOREIGN PATENT DOCUMENTS 0021228  2/1978  Japan .................. 106/600

*Primary Examiner*—Paul Marcantoni
*Attorney, Agent, or Firm*—Oblon, Spivak, McClelland, Maier & Neustadt, P.C.

[57] ABSTRACT

A surface-treating agent for a high-temperature refractory material, essentially consisting of 35.0 to 50.0 wt % of sodium silicate, 1.0 to 10.0 wt % of lithium compound, 1.0 to 10.0 wt % of alkali borate, 1 to 10.0 wt % of an organic silicone compound represented by the formula, R—Si(OH)$_2$Na, wherein R stands for an alkyl group of 1 to 12 carbon atoms, and water and having a viscosity of not more than 100 cps at 20° C., and a method for the surface treatment of a high-temperature refractory material, essentially consisting of rapidly spraying the treating agent mentioned above onto the surface of the refractory material when it is at a temperature in the range of 500° to 1200° C., thereby forming a layer of the treating agent in a molten state, and retaining the layer at a temperature of at least 1100° C.

8 Claims, 6 Drawing Sheets

PERIOD OF HEATING AT A TEMPERATURE OF 900°C TO THE BRICK WHOSE SURFACE TEMPERATURE IS 1100°C

SURFACE-TREATING AGENT FOR HIGH-TEMPERATURE REFRACTORY MATERIAL AND METHOD FOR TREATMENT THEREWITH

BACKGROUND OF THE INVENTION

1. Field of the Invention

This invention relates to a surface-treating agent for a high-temperature refractory material to be used for coating the surface of fire bricks exposed to high temperatures as in a coke-producing oven (coke oven), a ceramic oven, a cement kiln, or a power plant boiler with a layer of the treating agent having a high assay of silica and high strength thereby improving the durability and the gas permeation preventing property of the fire bricks, and to a method for the treatment by the use of the surface-treating agent.

2. Description of the Prior Art

As means to improve the refractoriness of fire bricks, there has long been used a method which comprises applying tar or petroleum pitch to the surface of freshly manufactured fire bricks, allowing the coated bricks to stand under a reducing condition, and smoothing the surface of the bricks by causing the silica content in the surface region to melt in consequence of a fall in the melting point of the silica content.

This method first requires cold application of tar or petroleum pitch. Thus, this application to the surface of fire bricks such as in a coke oven cannot be implemented while the oven is in operation because of the possibility of the tar or petroleum pitch catching fire in the hot oven. If the fire bricks are cooled for each application, their service life will be shortened.

Recently, a method for forming a dense surface layer on the surface of fire bricks by melt injecting a fine powder of silicon oxide or calcium oxide at an extremely high temperature onto the surface (plasma flame spraying method) has been proposed (Japanese Patent Public Disclosure Sho 61-93384). This method is suitable for the repair of extremely limited portions such as the joints between adjacent bricks. If adopted for the entire surface of a fire brick, it tends to impair the surface uniformity.

Fire bricks which are used for lining the inner furnace walls of coke-producing ovens (coke ovens), ceramic ovens, cement kilns, power plant boilers and the like are broadly classified into the silica type, the chamotte type, the alumina type, and the like based on such factors as refractoriness, strength, and the nature of the object to be heated in contact therewith. These fire bricks are manufactured by crushing raw materials, thoroughly mixing the resultant powder with water, placing the wet mixture in a molding frame, drying the mixture in the frame, and firing the dried mixture at a temperature in the neighborhood of 1200° C. After an oven has been constructed with fire bricks manufactured in this manner, it is dried and test operated at a uniform temperature to relieve it of stress, and thereafter put to actual operation.

The fire bricks have high porosity and exhibit heat insulating property. The flat surfaces of the fire bricks at the time of constructing the oven are gradually excoriated by peeling and chipping and lose their smoothness when abraded by the raw materials introduced into the oven and exposed to frequent repetitions of cooling and heating. As a result, they gain in friction resistance and aggravate the adhesion to their surfaces of raw materials and carbon resulting from combustion, possibly to the extent of posing an operational problem.

A coke oven will now be described as an example to facilitate further description of the fire bricks.

The coke oven is composed of a so-called carbonization chamber for producing coke by the dry distillation of coal and a combustion chamber used for application of heat. The carbonization chamber and the combustion chamber are generally separated from each other by a partition wall formed of silica type fire bricks. The carbonization chamber is a rectangular cavity measuring approximately 6 to 7 m in height, 15 to 16 m in length, and 40 to 50 cm in width. To facilitate the discharge of the produced coke from the oven, the width is slightly increased toward the discharge side (hereinafter referred to as "coke discharge side").

A compound coal as the raw material is supplied in batches by a charging truck to the oven through a charging inlet disposed on the ceiling side of the carbonization chamber, evened off to a uniform height with a leveler annexed to a pushing device installed in a direction opposite to the coke discharge side, and then heated. After the dry distillation is completed, the opposite doors of the oven are opened, the dry distilled coal is pushed out through the coke discharge side by the pushing device, fire extinguished by a fire extinguishing device, and cooled into coke as a finished product.

In the process of coking, the tarry substance in the compound coal is gasified and, at the same time, the fire bricks of the oven are exposed to harsh conditions at high temperature. To produce high-strength coke, the practice in recent years has been to dry the compound coal prior to introduction into the carbonization chamber (generally until the water content thereof is lowered from the original level of 8 to 12% to a level in the approximate range of 5 to 6%), to heighten the bulk density of the compound coal.

When the fire bricks lose their smoothness above, the carbon produced within the compound coal during the coking process is deposited on the surface of the fire bricks to the extent of aggravating the surface unevenness and the deposit of the carbon on the surface decreases the width of the carbonization chamber and adds to the resistance offered to the coke being pushed out of the oven, possibly to the extent of posing a serious operational problem. When the coke is forcibly pushed out, the joints which fill the gaps between the adjacent fire bricks is damaged, allowing the raw gas from the carbonization chamber to pass into the combustion chamber and be discharged as air-polluting black smoke through the smokestack.

To cope with this problem, the deposit on the surface of fire bricks in the hot carbonization chamber is removed subsequent to the discharge by use of a metal bar or by introducing air to burn the carbon adhering to the fire bricks. Removal of the carbon adhering to fire bricks by blowing air or oxygen against the carbon and inducing combustion thereof is described in Japanese Patent Public Disclosure Hei 2-24392 and Japanese Patent Public Disclosure Hei 3-111487. When the problem persists, the operator enters the carbonization chamber after it has been thoroughly cooled and replaces damaged fire bricks with newly supplied fire bricks and repairs the damaged portions of the joints. Thus, the operator is, exposed to a bad work environment. Moreover, the gradual cooling of the carbonization chamber inevitably entails an immense loss of thermal energy. A need has therefore been felt for the development of a method which enables the surface treatment of fire bricks to be carried out easily and quickly by making use of the high heat of the carbonization chamber without having to interrupt the operation of the oven.

SUMMARY OF THE INVENTION

The present inventors continued a study with a view to providing such a method and have perfected this invention as a result.

Specifically, this invention relates to a surface-treating agent for a high-temperature refractory material, essentially consisting of 35.0 to 50.0 wt % of sodium silicate, 1.0 to 10.0 wt % of lithium hydroxide, lithium carbonate, and lithium chloride, 1.0 to 10.0 wt % of alkali borate, 1 to 10.0 wt % of an organic silicone compound represented by the formula, R—Si(OH)$_2$Na, wherein R stands for an alkyl group of 1 to 12 carbon atoms, and water and having a viscosity of not more than 100 cps at 20° C., and to a method for the surface treatment of a high-temperature refractory material, essentially consisting of rapidly spraying the treating agent mentioned above at a ratio in the range of 0.05 to 4.0 kg/m$^2$ onto the surface of the refractory material when it is at a temperature in the range of 500° to 1200° C., thereby forming a layer of the treating agent in a molten state, and retaining the layer at a temperature of at least 1100° C., thereby forming on the surface of the refractory material a layer having a high assay of silica, a smooth surface, and high strength.

The above and other features of the invention will become apparent from the following description made with reference to the accompanying drawings.

DESCRIPTION OF THE PREFERRED EMBODIMENTS

This invention will now be described in detail.

The treating agent according to this invention is produced by dissolving the relevant components in water. This use of water is necessary because the treatment is conducted in a high-temperature environment that makes use of inflammable organic solvent unsafe.

Further, since the lithium compounds and the alkali borate in the treating agent lower the melting point of sodium silicate, the molten layer of the treating agent can be formed at a lower temperature than when sodium silicate is used alone.

The organic silicone compound is incorporated in the treating agent for the purpose of enabling the treating agent being applied to the surface of a refractory material to attach uniformly to the surface. Generally, when the surface to be coated has a temperature exceeding 400° C., the organic silicone compound is decomposed and the effect of its incorporation in the treating agent is degraded or totally lost. In this invention, however, since treating agent kept at room temperature is applied instantaneously as by means of a spray nozzle to a high-temperature surface, the temperature of the surface is lowered very briefly and the applied agent is enabled to form a uniform layer in spite of the high surface temperature.

When the treating agent of this invention is applied to the surface of a refractory material as described above, it first forms a molten layer on the surface and this layer reacts with the surface layer of the refractory material. The ambience in the oven, specifically the enclosure accommodating the refractory material, is retained at a temperature exceeding 1100° C. When the temperature of this ambience is lower than 1100° C., it is heated to a temperature exceeding 1100° C. As a result, the alkali content in the treating agent is evaporated or sublimated and the applied layer of the treating agent is enabled to have a high assay of silica, smooth surface, and high strength.

In typical fire bricks of the silica type, chamotte type, or the alumina type, the permeation of an alkali component causes chemical spalling. Owing to its aforesaid composition, however, the treating agent of this invention does not cause chemical spalling.

The components of the treating agent of this invention will be described below.

It is necessary that the SiO$_2$/Na$_2$O molar ratio of the sodium silicate be in the range of 3.2 to 3.8. The sodium silicate is effective so long as it is soluble in water. The appropriateness of the sodium silicate increases as its silica content rises within the molar ratio mentioned above.

If the content of sodium silicate falls short of the lower limit, 35.0 wt %, the amount of the treating agent adhering to the refractory material will be unduly small and the total time of spraying will be unduly long. If it exceeds 50.0 wt %, the viscosity of the composition sharply increases, possibly to the extent of rendering the application thereof by spraying difficult.

From the practical point of view, this content appropriately falls in the range of 40 to 45 wt %.

Lithium compounds and alkali borates have the effect of lowering the melting point of sodium silicate. The contents of these compounds in the treating agent are each in the range of 0.1 to 10 wt %. If these contents are unduly small, it will be no longer possible to lower the melting point of sodium silicate. If the contents are unduly large, the ultimately formed layer of the treating agent will be deficient in strength. Lithium hydroxide proves particularly appropriate among other lithium compounds and sodium borate among other alkali borates. From the practical point of view, it is particularly advantageous to use lithium hydroxide in an amount in the range of 5 to 10 wt % and sodium borate in an amount in the range of 4 to 8 wt %.

Among the organic silicone compounds represented by the general formula mentioned above, those having alkyl groups of one to four carbon atoms prove particularly preferable. The reason for this is that the solubility of such an organic silicone compound in water increases and the stability of the aqueous solution of the compound (the resistance of the solute to precipitation) rises in proportion as the number of carbon atoms in a relevant alkyl decreases.

From the practical point of view, the contents mentioned above appropriately fall in the range of 3.0 to 8.0 wt %.

The amount of the treating agent to be sprayed is limited to the range of 0.05 to 4.0 kg/m$^2$ for the following reason.

If this amount is unduly small, the layer to be formed on the surface is too thin for the layer to acquire amply high strength. If the amount is unduly large, the layer of the treating agent applied to fire bricks will sustain cracking during the process of temperature elevation and will possibly form an inferior surface coating.

Practically, it is preferable to use an amount in the range of 1–3 kg/m$^2$.

EXAMPLE

The invention will now be described more specifically below with reference to a working example shown in the annexed drawings.

As a treating agent according to this invention, a mixed liquid of Formulation Example 1 composed of 35 parts of sodium silicate ($SiO_2/Na_2O$ molar ratio=3.5), 5 parts of lithium hydroxide, 7 parts of sodium borate, 3 parts of an organic silicone compound [$CH_3$—$Si(OH)_2ONa$], and 50 parts of water, as shown in Table 1, was prepared.

To clarify the effect of the treating agent of Formulation Example 1 mentioned above, a mixed liquid composed of 50 parts of sodium silicate ($SiO_2/Na_2O$ molar ratio=3.5) and 50 parts of water was used as a comparative formulation example.

TABLE 2

| Compressive strength (MN/m$^2$) | | 37.3 |
|---|---|---|
| Porosity (%) | | 21.0 |
| Bulk density | | 1.82 |
| Chemical composition (%) | $SiO_2$ | 94 |
| | $Al_2O_3$ | 0.9 |
| | CaO | 2.7 |
| | $Fe_2O_3$ | 0.9 |
| | Cr | |
| X-ray diffraction | α-Tridmite | +++ |
| | β-Cristobalite | + |
| | Corundum | − |
| | Si | + |

Figure 1:
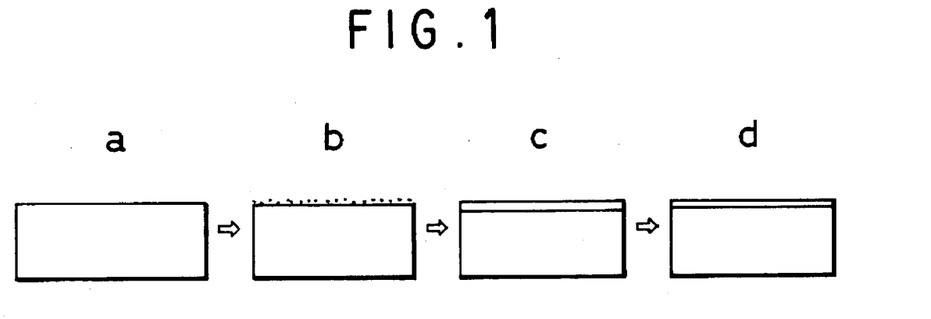
FIG. 1 is a conceptual diagram showing the consequences of the application of a treating agent of this invention to the surface of a brick.

First, for the explanation of the action of the treating agent of this invention, the consequences of the application of the treating agent to the surface of fire bricks are shown in the conceptual diagram of FIG. 1.

First, the treating agent is applied to the surface of fire bricks as a high-temperature refractory material.

Usually, the surface temperature of the fire bricks to which the treating agent is applied is in the range of 500° to 1200° C. The possibility of the surface temperature exceeding the upper limit of this range is remote. On the other hand, the possibility of this temperature falling below 500° C. during the replacement of the raw material in a device accommodating the refractory material to be coated with the treating material is fairly high. In this case, since the treating agent in its original liquid state permeates deeply into the bricks, the amount of the active component of the treating agent available for the reaction on the surface of the bricks is consequently decreased and the treating agent fails to attain the desired effect. Moreover, the alkali which permeates to the core of bricks and remains therein may lower the strength of the bricks.

TABLE 1

| Treating agent | Formulation Example 1 | Comparative Formulation Example (commercially available sodium silicate) | Remarks |
|---|---|---|---|
| Appearance | Colorless transparent liquid | | |
| Solid content (%) | 50.0 | | |
| pH (master solution) | 12 | | |
| Specific gravity | 1.32 | | |
| Viscosity (cps) | 15.0 | | |
| Thermal properties | | | |
| Foaming (°C.) | 500 | 520 | Foaming by decomposition of solids |
| Melting (°C.) | 700 | 852 | Temperature for starting reaction |
| Reaction concluded (°C.) | 1200 | | Temperature of evaporation of Na component |
| [Composition] wt % | | | |
| Sodium silicate | 35% | 50% | |
| Lithium hydroxide | 5% | 0% | LiOH |
| Sodium borate | 7% | 0% | $Na_2B_4O_7$ |
| Organic silicone compound | 3% | 0% | $CH_3Si(OH)_2ONa$ |
| Water | 50% | 50% | |
| (Total) | 100% | 100% | |

As a refractory material, silica type fire bricks commonly used in coke oven carbonization chambers were used. The typical properties of the fire bricks are shown in Table 2.

This invention defines the temperature of the refractory material (bricks) at the time that the treating agent is applied thereto to be not less than 500° C. for the following reason.

(a) The treating agent uniformly applied to the surface of fire bricks at a temperature in the range of 500° to 1200° C.

(b) is instantaneously dehydrated and caused to form a layer of solids in a foamed state.

(c) In the present example, since the melting point of the treating agent is set at 700° C., the treating agent is gradually melted at the temperature of the surface of the fire brick and, so long as the amount of the treating agent applied is 2.0 kg/m² (surface of application), the layer of the treating agent in a molten state is formed to a depth in the approximate range of 1.0 to 1.2 mm from the brick surface.

(d) When the furnace using the refractory material is put to use in the ensuant state and the surface temperature of the bricks is consequently elevated to a level exceeding 1100° C., the alkali component in the treating agent and the surface of silicon dioxide particles as the matrix of the bricks react with each other and convert into a solution. When the surface temperature is subsequently elevated to about 1200° C., the alkali component is rapidly evaporated and the melting point of the material is raised in consequence of the rise of the silica concentration and a layer of the treating agent having a smooth surface, a high density, and a high strength is completed.

Figure 2:
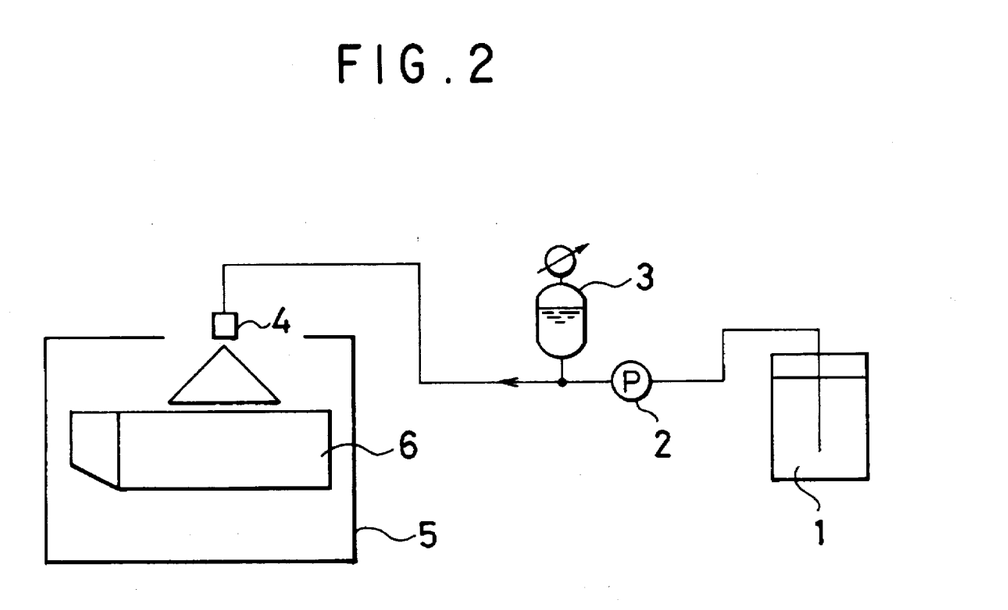
FIG. 2 is a schematic diagram showing a method for applying the treating agent of this invention by spraying onto a silica brick in an electric oven.

To explain the procedure involved in the use of the treating agent of this invention, one example of the application of the treating agent to fire bricks used in an electric oven is depicted in a schematic diagram of FIG. 2.

In the illustrated working example, a treating agent 1 of this invention was pushed out with a metering pump 2. Since this metering pump 2 generally pulsates and operates unstably, it was furnished with an air chamber 3 adapted to prevent the pulsation. The treating agent flowing stably was sprayed in the form of mist through a spray nozzle 4 of a perfectly circular shape. The spray nozzle 4 was controlled with a timer to spout the treating agent at the rate of 2 kg per square meter of the surface of a silica type fire brick 6 used in an electric oven 5.

The temperature of the surface application of the treating agent was kept at 900° C. for two hours. The other test conditions are shown in Table 3.

TABLE 3

| Test item | Particulars |
| --- | --- |
| 1. Sort of brick tested | Silica type fire brick |
| 2. Size of brick | 150 × 200 × 50 mm (thickness) |
| 3. Surface area of brick | 300 cm² |
| 4. Amount of agent applied | 2.0 kg/m² |
| 5. Surface temperature at the time of application | Immediately after 2 hours' heating of sample brick (in electric oven) at 900° C. |
| 6. Temperature of heating at the time of application | Heating at 1100° C. immdiately after application |
| 7. Measurement of amount of alkali | Refer to the remark below. |

Remark: After the coated sample was heated for a stated period and then cooled, the layer of the treating agent was scraped. The shavings were ground and dissolved in 5% hydrochloric acid. The resultant solution was tested for alkali content by determining the absorbance of the solution with an atomic absorptiometer.

It is necessary that the sodium in the treating agent be quickly evaporated or sublimated after completion of the reaction and precluded from remaining on the surface of a brick. This fact has been already pointed out in connection with the statement that an alkali aggravates chemical spalling. Here, for the purpose of establishing that the method of this invention attains removal of an alkali, reference is made to FIG. 3, which shows the results of the determination of residual alkali (Na) content.

A brick kept at 900° C. was coated with the treating agent by means of the spray nozzle and was immediately heated at 1100° C. for a prescribed period. After the elapse of this prescribed period, the brick was extracted from the electric oven. The layer of the treating agent formed on the surface of the brick was scraped. The shavings were ground and dissolved in a 5% hydrochloric acid solution. The resultant solution was tested for alkali content by determining the absorbance of the solution by means of an atomic absorptiometer. The alkali content consequently found is reported as reduced to $Na_2O$.

Figure 3:
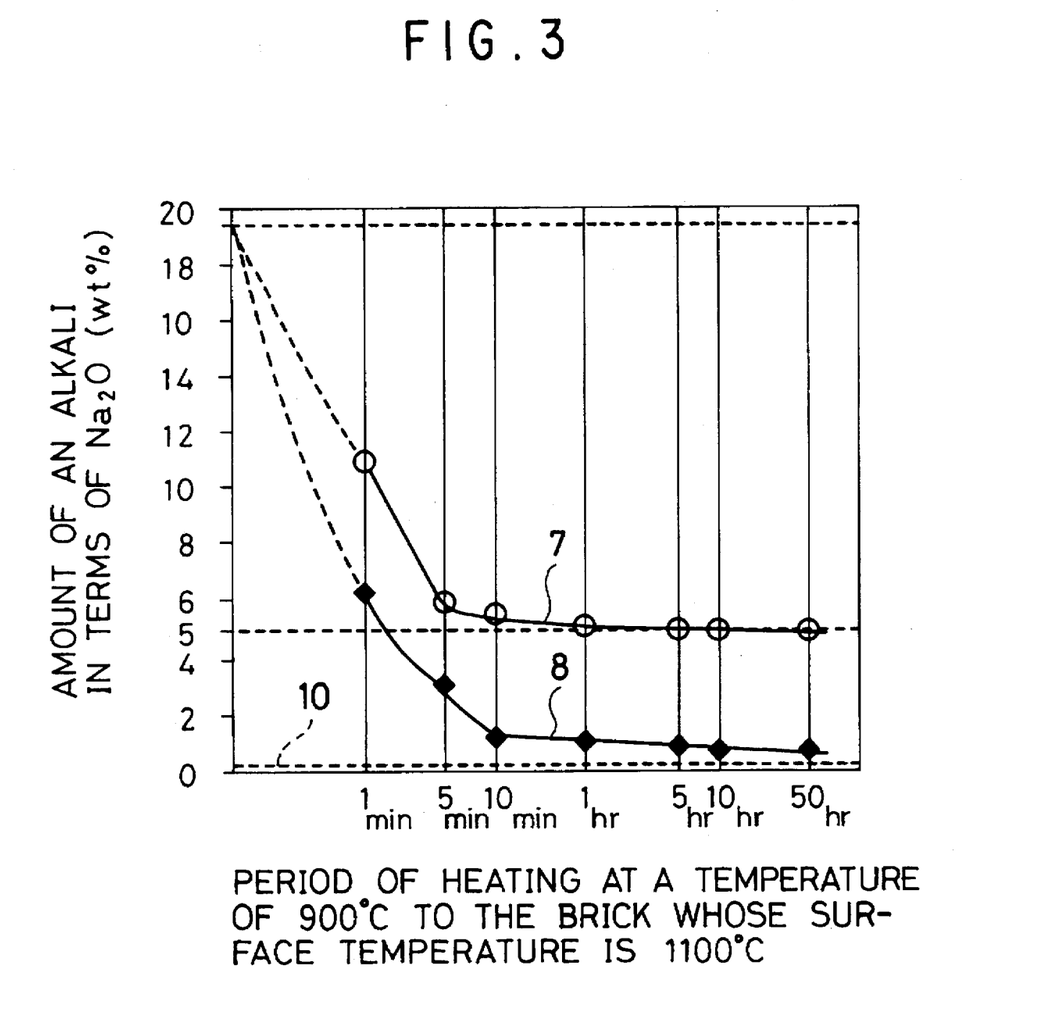
FIG. 3 is a diagram showing the time-course changes in the amount of residual alkali on the surfaces of bricks coated with the treating agent of this invention and with sodium silicate alone.

The results are shown in FIG. 3.

In FIG. 3, the curve 7 represents the data obtained of the treating agent of this invention having a composition of Formulation Example 1 and the curve 8 the data obtained of the treating agent of Comparative Formulation Example. In FIG. 3, the vertical axis is scaled for the amount of an alkali in terms of $Na_2O$ and the horizontal axis is scaled for the heating time. In the diagram, the curve 9 formed of a dotted line represents the average amount of $Na_2O$ (19.5 wt %) in the solids of the surface treating agent and the curve 10 formed of a dotted line the amount of $Na_2O$ in a silica type fire brick.

Five minutes after the surface temperature of the brick reached 1100° C., the alkali content in the layer formed of the treating agent of Formulation Example 1 showed a sudden decrease. In 10 hours or more thereafter, the alkali content decreased to a value approximating 0.15% of the original $Na_2O$ content of the silica type brick tested. These results prove the absence of permeation of the alkali into the brick. In the case of the treating agent of Comparative Formulation Example containing 50% of sodium silicate alone, the residual alkali content was 5% or more even after the elapse of 50 hours.

The difference noted above clearly indicates that lithium hydroxide and sodium borate incorporated in the treating agent for the purpose of lowering the melting point of sodium silicate make an effective contribution and that the alkali is quickly evaporated and sublimated.

Figure 4:
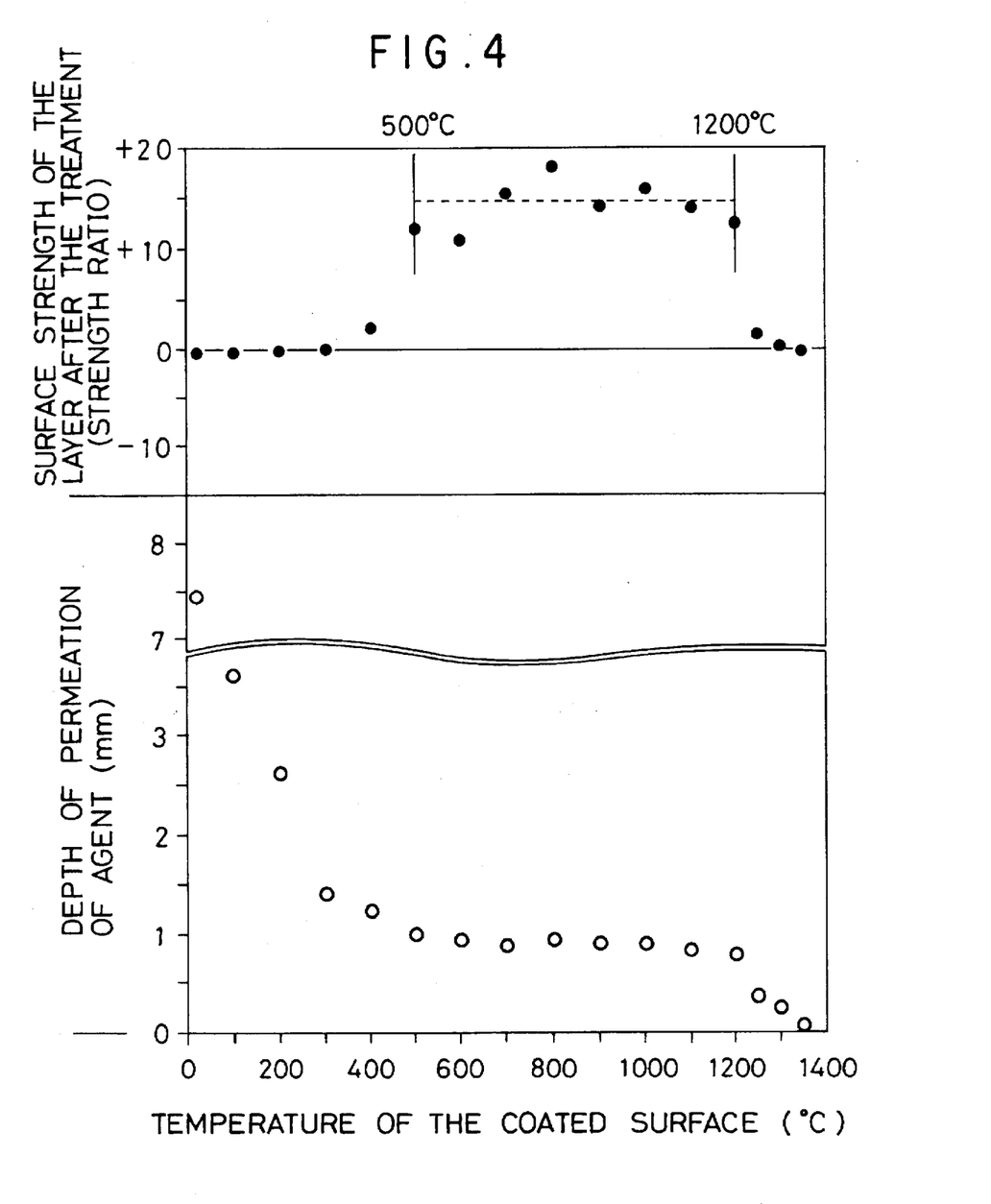
FIG. 4 is a diagram showing the surface temperature of a brick at the time of application of the treating agent of this invention, the depth of permeation of the agent treatment in the brick from the surface thereof, and the surface strength after the reaction.

The thickness of the layer of the treating agent and the surface strength of the layer after the treatment was carried out for 20 hours under the same conditions as above will be described below with reference to FIG. 4. The depth of permeation of the treating agent into the brick from the surface thereof was determined by applying the treating agent to the surface of the brick at the temperature of application, immediately placing the coated brick in an electric oven kept at 1100° C., heating the brick for 20 hours therein, and measuring the depth of reaction and that of permeation appearing in a cross section of the brick by means of a vernier caliper. The surface strength after the reaction was determined by measuring the Vickers hardness of the surface of the brick treated under the same conditions, obtaining this hardness for the surface of a brick which was not treated, and comparing the results of this measurement.

First, as regards the depth of permeation of the treating agent into the brick from the surface thereof, the evaporation of the water in the treating agent was delayed when the temperature of the coated surface fell to below 300° C. When the temperature was 100° C., for example, the permeation reached a depth of 3.2 mm into the brick and no surface reaction layer was formed. The surface strength after the heating at 1100° C. showed absolutely no change from the strength of the brick tested. The reason for these results is that the internal permeation is unduly large and the treating agent is melted and the power thereof to react with the surface of the brick is consequently diminished.

It was found that a temperature of the coated surface exceeding 1250° C. is too high because at such a temperature the applied treating agent instantaneously solidifies and scatters in the form of a fine powder. Thus, the permeation is not obtained to a satisfactory depth (thickness of the layer of the treating agent) and the surface strength shows virtually no improvement.

When the temperature of the coated surface is in the range of 400° to 1200° C., the treating agent foams, melts, and gives rise to a layer of reaction with the brick surface. The depth of permeation (thickness of the layer of the treating agent) levels off practically in the neighborhood of 1 mm and the strength rises by +15% above that of an untreated brick tested at a temperature in the range of 500° to 1200° C.

It is on the basis of these results that the invention defines the temperature of the surface of the refractory material to be coated by the treating agent to be in the range of 500° to 1200° C.

Now, the relation between the concentration of the organic silicone compound in the treating agent and the thickness of the layer of the treating agent will be described more specifically below with reference to FIG. 5.

Samples of the treating agent containing solids at a fixed concentration of 50% and an organic silicone compound ($CH_2Si(OH)_2ONa$) at varying concentrations in the range of 0 to 10% were tested to determine the thickness of the layers of treating agent formed on the surface of a refractory material.

The amount of the treating agent applied was 2 kg/m$^2$, the temperature of the surface at the time of coating was 900° C., the heating temperature was 1100° C., and the treating time was 10 hours.

The thickness of the layer of the treating agent was fixed at 1 mm in the test.

Figure 5:
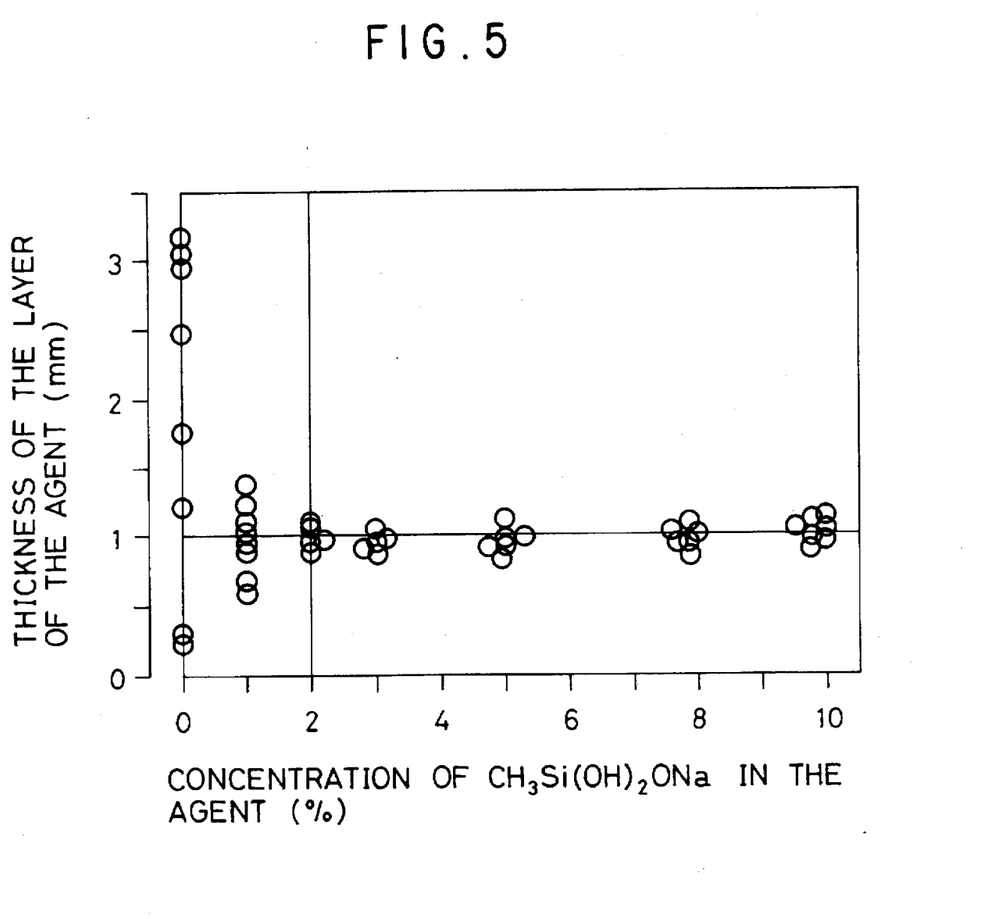
FIG. 5 is a diagram showing the relation between the concentration of an organic silicone compound in the treating agent of this invention and the thickness of the treating agent layer.

FIG. 5 shows the change in thickness of the layer of the treating agent formed with the amount of the organic silicone compound ($CH_2Si(OH)_2ONa$) varied in the range of 0 to 10%. The thickness varies over a wide range of 0.2 to 3.3 mm when the amount of the compound incorporated is 0%. From this fact and the diagram of FIG. 4, which shows the relation between the depth of permeation and the strength, it can be easily infered that the strength enhancing effect is not obtained in the absence of this compound.

The layer of the treating agent acquires a uniform thickness when the amount of the organic silicone compound incorporated reaches 1%. It acquires a very stable and constant thickness when the amount is between 2% and 10%.

It is on the basis of these results that the invention defines the content of the organic silicone compound in the treating agent to be in the range of 1 to 10%.

Further, the organic silicone compound undergoes thermal decomposition at a temperature of not less than 500° C. and gives rise to a silicon dioxide powder of high purity having a particle diameter of not more than 0.1 µm. It is, therefore, effective also in filling the pores in the matrix of the bricks and promoting the densification of the layer of the treating agent.

The treated layer which has been melted by the treating agent and then densified by silicon dioxide as described above acquires a smooth surface, represses the adhesion thereto of the carbon emitted during the operation of the furnace and the ashes contained in the compound coat, and reduces the resistance to the discharge of the produced coke from the furnace. The surface roughness of this layer of the treating agent will be described more specifically below.

The untreated bricks (new bricks) used in the test had an average surface roughness of 0.1 mm. When the temperature of the surface of the brick applied with the treating agent was lower than 400° C., the permeation of the treating agent into the brick proceeded too deeply and a fully satisfactory layer of the treating agent was not obtained. Thus, less improvement of surface roughness was obtained. When the temperature was lower than 200° C., the surface roughness of the brick equaled that of untreated test brick.

At temperatures in the range of 500° to 1200° C., the average surface roughness was 0.004 mm, a value practically equaling that of ordinary glass. At temperatures exceeding 1250° C., the effect aimed at was degraded because the treating agent already applied to the surface was scattered in the form of a fine powder as mentioned earlier. At 1350° C., the surface roughness of the layer was equal to that of untreated test brick.

The results of the various tests described above were verified by a field test using an actually operating industrial coke oven. The results of the field test are as shown below.

Figure 6:
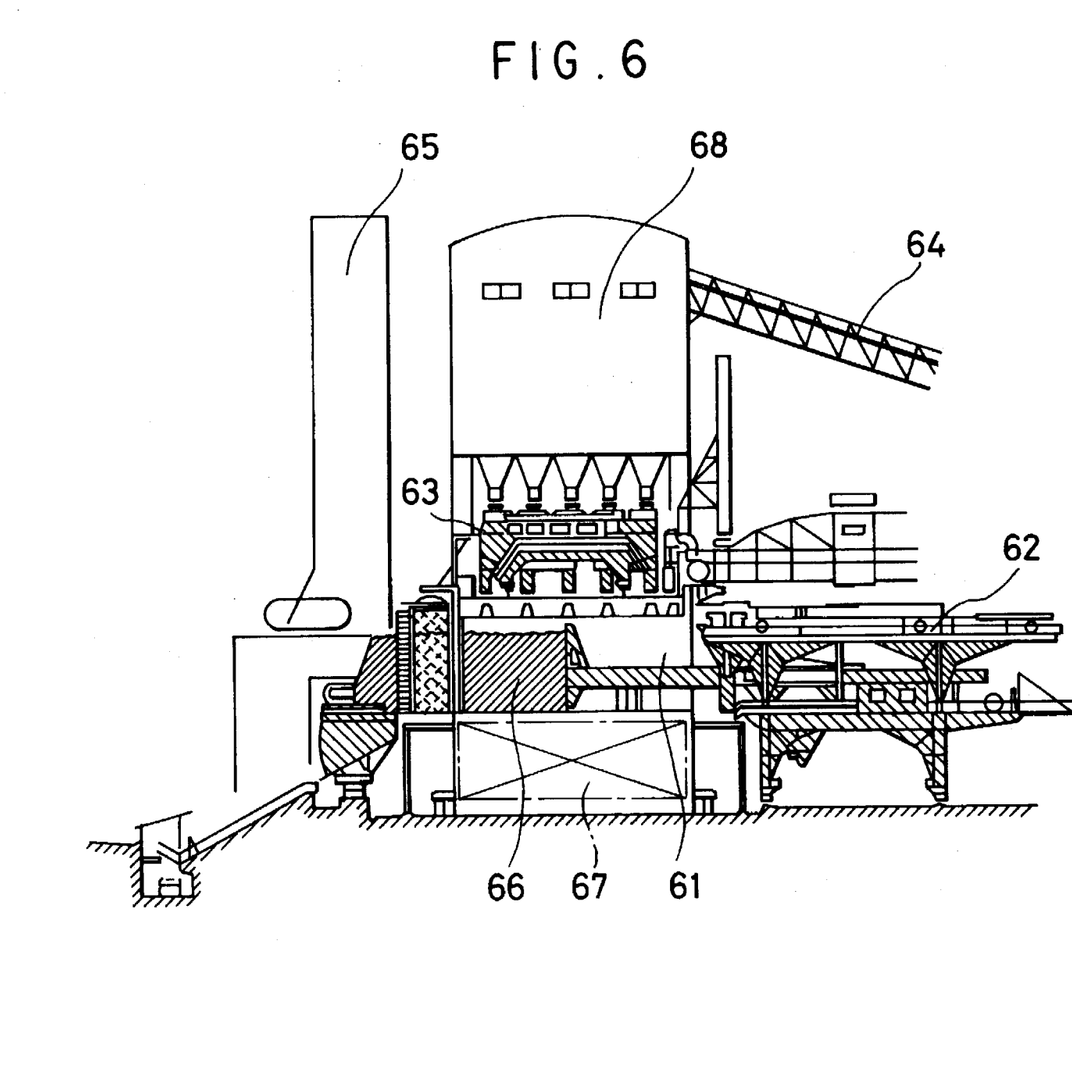
FIG. 6 is a cross section of a coke oven used for a field test.

The structure of the coke oven used in the field test is shown in FIG. 6.

The red-hot coke produced by dry distillation in a carbonization chamber 61 is discharged toward the coke discharge side by a pusher ram annexed to a pusher 62. The carbonization chamber from which the coke has been pushed out is kept at a high temperature in the range of 1000° to 1200° C. The compound coal which is the raw material for the coke is moved by a charging truck 63 and introduced via a charging inlet into the carbonization chamber 61. In the present working example, test bricks set in place in advance in the carbonization chamber 61 were used for the evaluation.

In the diagram, 64 designates a belt conveyor for the transfer of the raw material coal, 65 a fire extinguisher, 66 coke, 67 a regenerator, and 68 a raw material coal bin.

Figure 7:
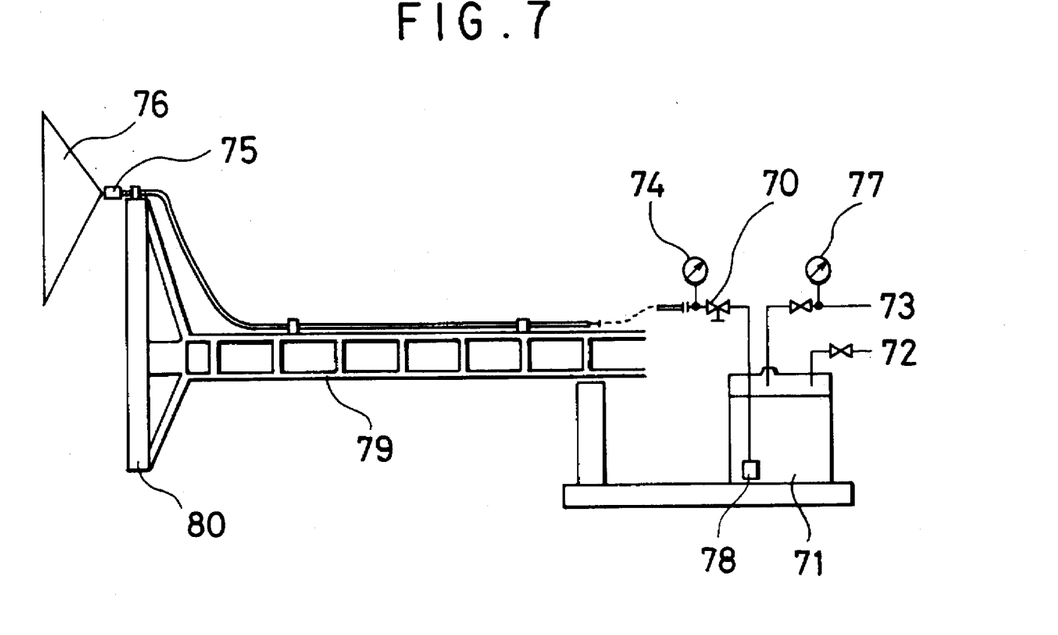
FIG. 7 is a side view showing one example of the application of a treating agent to a coke oven.

Now, the method of the test will be described below with reference to FIG. 7. A treating agent tank 71 (having a capacity of 100 liters) installed on the pusher was filled with a liquid treating agent 72 and the valve was closed. Compressed air 73 was introduced into the tank 71 to discharge the treating agent 72 and a flow volume adjusting valve 70 was actuated to adjust the reading of a treating agent pressure gauge 74 to 3.2 kg/cm$^2$. A spray nozzle 75 for the treating agent was fixed above the leading end of the pusher ram and adapted to emit a spray 76. In the diagram, 77 designates an air pressure gauge, 78 a strainer, 79 a pusher ram, and 80 the leading end of the pusher.

Figure 8:
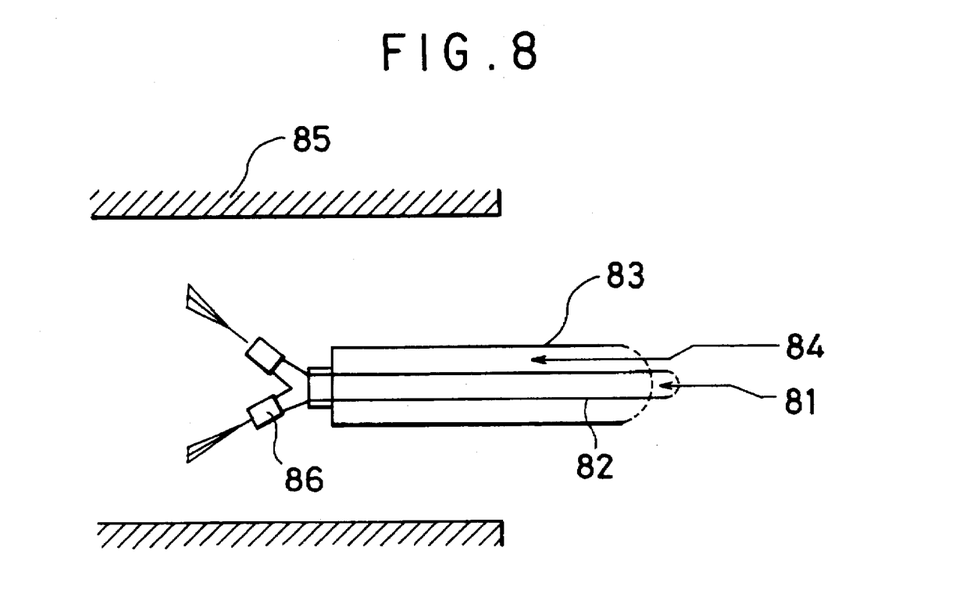
FIG. 8 is a diagram showing one example of a device for spraying a treating agent onto a refractory material for use in a coke oven.

Since the temperature of the carbonization chamber was high, a treating agent conduit 82 for a treating agent 81 was provided on the outer part thereof with a protective tube 83 adapted to circulate cooling water 84 for cooling the conduit 82. In the diagram, 85 designates a wall of fire bricks.

Two spray nozzles 86 adapted to spout spray in symmetrically fan-shaped cross sections in response to the motion of the pusher ram were so disposed as to allow the spray to impinge on the opposite sides of the carbonization chamber.

Ten rectangular facing silica type bricks (350×450×150 mm) for the test were attached to the surface of the existing bricks in the carbonization chamber 50 cm below the ceiling part (charging inlet) thereof, i.e. the part anticipated to be exposed to the ambience of the highest temperature during operation, after the carbonization chamber was cooled prior to one batch operation, and immobilized on the surface by means of angles and a joining agent. The details of the test and the results of the test are described in Table 4.

TABLE 4

|  | Particulars | Remark |
|---|---|---|
| Test conditions | | |
| Type of brick tested | Silica type fire brick | |
| Chemical composition of bricks tested | Per Table 2 | |
| Size of bricks tested | 350 × 450 × 150 mm | |
| Amount of treating agent applied | 2.0 kg/m$^2$ | |
| Pressure used for application | 3.2 kg/m$^2$ | |
| Average surface temperature during application | 850° C. | |
| Number of operations of coke oven after application | 12 | Total time of operation: 250 hours |
| Maximum surface temperature during operation | 1350° C. | Estimated (from design value) |
| Minimum surface temperature | 950° C. | Estimated (at time of introduction of compound coal) |
| Test results | | (Uncoated brick for comparison) |
| Average amount of carbon deposited | Below 0.1 g/m$^2$ | 1.9 g/m$^2$ |
| Surface cracking | None | None |
| Minimum layer thickness | 1.1 mm | |
| Maximum layer thickness | 1.5 mm | None |
| Average layer thickness | 1.3 mm | |
| Average strength of layer | +10.2 | −2.5 (surface |
| Average roughness of layer | 0.007 mm | 0.650 mm |
| Minimum amount of Na in layer of treating agent | 0.1 | |
| Maximum amount of Na in layer of treating agent | 0.9 | |
| Average amount of Na in layer of treating agent | 0.4 | |

The average temperature of the surface of the bricks in the carbonization chamber at the time of application of the treating agent was 850° C. After the application of the treating agent, the door to the carbonization chamber was closed, the compound coal was introduced into the oven through the charging inlet, and the lid of the charging inlet was closed. The coal held in the carbonization chamber was baked by the heat from combustion chambers disposed on either side of the carbonization chamber to produce coke. Thus, the coke was manufactured batchwise.

After the application of the treating agent to the bricks, 12 batches of coke were produced in the coke oven. After the 12th batch, the carbonization chamber was cooled and the test bricks were removed from the oven and examined to analyze the improvement in the coated surface. For comparison, bricks which had been given no surface treatment were similarly removed from the oven and put to the same analysis.

The results of the test indicate that the amount of such solids as carbon and ashes adhering to the brick surface was not more than 0.1 g/m$^2$ in the case of the bricks coated with the treating agent, compared with 1.9 g/m$^2$ in the case of the untreated bricks.

The layers of the treating agent on the surfaces of the coated bricks had glass-smooth surfaces and sustained absolutely no cracks. Their thicknesses fell in the range of 1.1 to 1.5 mm and averaged about 1.3 mm, a value substantially meeting the estimated magnitude.

The surface strength of the bricks coated with the treating agent showed an increase of +10.2% over that of the bricks prior to the test (new bricks). This increase is an obvious improvement over the value of −2.5% obtained for comparison the bricks.

The surface roughness of the bricks coated with the treating agent was 0.007 mm, a value indicating a decisively higher smoothness than the value of 0.650 mm obtained for the untreated bricks.

Besides, the amount of Na in the layer of the treating agent fell in the range of 0.1 to 0.9 (averaging 0.4%), values closely approximating the average value, 0.15%, obtained of the bricks prior to use. From these values it can be safely concluded that the reaction of the treatment contemplated by this invention had reached completion.

The numerical values obtained in the present test are in good agreement with those obtained in a test conducted with the electric oven described above.

The treating agents of the compositions of Formulation Examples 2 through 5 and the treating agent of the composition of Comparative Formulation Example indicated in Table 5 were used in the same manner as in the preceding test for the production of 100 batches of coke. The bricks were then tested for porosity (%) and compressive strength (MN/m$^2$) of the surface layers. The results are shown in Table 6. Bricks neither coated with the treating agent nor treated otherwise were used as blanks for the test.

TABLE 5

|  | Formulation Example 2 | Formulation Example 3 | Formulation Example 4 | Formulation Example 5 | Comparative Formulation Example |
|---|---|---|---|---|---|
| [Composition] |  |  |  |  |  |
| Sodium silicate | 40% | 40% | 50% | 50% | 50% |
| (SiO$_2$/Na$_2$O) | (3.8) | (3.3) | (3.6) | (3.4) |  |
| Lithium hydroxide | 7% | 3% | 2% | 4% | — |
| Sodium borate | 4% | 8% | 5% | 2% | — |
| Organic silicone compound | 5% | 2% | 8% | 3% | — |
|  | C$_4$H$_9$Si(OH)$_2$ONa | C$_2$H$_5$Si(OH)$_2$ONa | C$_{10}$H$_{21}$Si(OH)$_2$ONa | C$_3$H$_7$Si(OH)$_2$ONa |  |
| Water | 44% | 47% | 35% | 41% | 50% |

TABLE 6

|  | Porosity (%) | Compressive Strength (MN/m$^2$) |
|---|---|---|
| Formulation Example 2 | 6.4 | 35.1 |
| Formulation Example 3 | 8.3 | 36.4 |
| Formulation Example 4 | 10.2 | 34.9 |
| Formulation Example 5 | 10.7 | 36.0 |
| Blank | 20.8 | 21.7 |
| Comparative Formulation Example | 19.4 | 28.2 |

While preferred embodiments of the invention have been shown and described, it is to be understood that the invention is not limited thereto but may be otherwise variously embodied and practiced within the scope of the claims for patent indicated hereinbelow.

The method of this invention for the surface treatment of high-temperature fire bricks described above allows a molten coating layer to be formed on the surface of a high-temperature refractory material used in a coke-producing furnace (coke oven), a ceramic oven, a cement kiln, or a power plant boiler for the purpose of imparting durability to the refractory material and vesting the refractory material with an improved ability to preclude gas permeation, easily and by effective use of the heat possessed by the furnace.

What is claimed is:

1. A surface-treating agent for a high-temperature refractory material, consisting essentially of 35.0 to 50.0 wt % of sodium silicate, 1.0 to 10.0 wt % of at least one lithium compound selected from the group consisting of lithium hydroxide, lithium carbonate, and lithium chloride, 1.0 to 10.0 wt % of an alkali borate, 1 to 10.0 wt % of an organic silicone compound represented by the formula, R—Si(OH)$_2$Na, wherein R stands for an alkyl group of 1 to 12 carbon atoms, and water and having a viscosity of not more than 100 cps at 20° C.

2. The agent according to claim 1, wherein said sodium silicate has a SiO$_2$/Na$_2$O molar ratio in the range of from 3.2 to 3.8.

3. The agent according to claim 1, wherein said lithium compound is lithium hydroxide.

4. The agent according to claim 1, wherein said alkali borate is sodium borate.

5. The agent according to claim 1, wherein the symbol R in the general formula for said organic silicone compound is an alkyl group of one to four carbon atoms.

6. The agent according to claim 3, wherein the content of said lithium hydroxide is in the range of 5.0 to 10.0 wt %.

7. The agent according to claim 4, wherein the content of said sodium borate is in the range of 4.0 to 8.0 wt %.

8. The agent according to claim 5, wherein the content of said organic silicone compound is in the range of 1.0 to 5.0 wt %.

* * * * *

UNITED STATES PATENT AND TRADEMARK OFFICE
CERTIFICATE OF CORRECTION

PATENT NO. : 5,681,383
DATED      : October 28, 1997
INVENTOR(S): Takeshi ANDOH, et al.

It is certified that error appears in the above-identified patent and that said Letters Patent is hereby corrected as shown below:

On the title page, item [73] has been omitted. It should be:

--[73] Assignee: 1) Kawasaki Steel Corporation, Kobe-shi;
                     2) Kawasaki Refractories Co., Ltd, Akoh-shi;
                     3) Taiho Industries Co., Ltd., Tokyo, all from Japan--

Signed and Sealed this

Third Day of February, 1998

Attest:

BRUCE LEHMAN

Attesting Officer

Commissioner of Patents and Trademarks